United States Patent
Iwasaki et al.

(10) Patent No.: US 12,412,397 B2
(45) Date of Patent: Sep. 9, 2025

(54) COMPUTER-READABLE RECORDING MEDIUM, INFORMATION PROCESSING METHOD, AND INFORMATION PROCESSING APPARATUS

(71) Applicant: Fujitsu Limited, Kawasaki (JP)

(72) Inventors: Sho Iwasaki, Yokohama (JP);
Fumiharu Tomiyasu, Yokohama (JP);
Genta Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 17/979,769

(22) Filed: Nov. 3, 2022

(65) Prior Publication Data

US 2024/0013541 A1    Jan. 11, 2024

(30) Foreign Application Priority Data

Jul. 7, 2022   (JP) .................................. 2022-109953

(51) Int. Cl.
| | |
|---|---|
| *G06V 20/52* | (2022.01) |
| *G06Q 20/18* | (2012.01) |
| *G06Q 20/32* | (2012.01) |
| *G06T 7/13* | (2017.01) |
| *G06T 7/62* | (2017.01) |

(Continued)

(52) U.S. Cl.
CPC ............ *G06V 20/52* (2022.01); *G06Q 20/18* (2013.01); *G06Q 20/3276* (2013.01); *G06T 7/13* (2017.01); *G06T 7/62* (2017.01); *G06T 7/70* (2017.01); *G06V 10/242* (2022.01); *G06V 10/25* (2022.01); *G06T 2207/30242* (2013.01)

(58) Field of Classification Search
CPC ...... G06V 20/52; G06V 10/242; G06V 10/25; G06V 20/64; G06V 20/68; G06V 10/82; G06Q 20/18; G06Q 20/3276; G06T 7/13; G06T 7/62; G06T 7/70; G06T 2207/30242
USPC ........................................................ 382/103
See application file for complete search history.

(56) References Cited

U.S. PATENT DOCUMENTS

| | | | |
|---|---|---|---|
| 7,631,808 B2 | 12/2009 | Kundu et al. | |
| 8,448,858 B1 | 5/2013 | Kundu et al. | |
| (Continued) | | | |

FOREIGN PATENT DOCUMENTS

| | | |
|---|---|---|
| JP | 2013-041354 A | 2/2013 |
| JP | 2020-135422 A | 8/2020 |

OTHER PUBLICATIONS

Extended European Search Report issued Jun. 6, 2023 in corresponding European Patent Application No. 22206089.9, 9 pages.

*Primary Examiner* — Chineyere Wills-Burns
*Assistant Examiner* — Lucius Cameron Gree Allen
(74) *Attorney, Agent, or Firm* — XSENSUS LLP

(57) ABSTRACT

A non-transitory computer-readable recording medium stores therein an information processing program that causes a computer to execute a process including, acquiring an image of an object storing items that is captured, extracting an object region of the object contained in the image by analyzing the image acquired, extracting one or more item regions contained in the extracted object region by analyzing the image acquired, estimating an item volume of the items stored in the object based on a position of an outline of the item region with respect to a position of the extracted object region, and specifying a number of items stored in the object based on the specified item volume.

20 Claims, 15 Drawing Sheets

(51) Int. Cl.
*G06T 7/70* (2017.01)
*G06V 10/24* (2022.01)
*G06V 10/25* (2022.01)
*G06V 10/82* (2022.01)
*G06V 20/64* (2022.01)
*G06V 20/68* (2022.01)

(56) References Cited

U.S. PATENT DOCUMENTS

| | | |
|---|---|---|
| 2016/0189277 A1 | 6/2016 | Davis |
| 2016/0342923 A1* | 11/2016 | Jones ................ G06F 3/0481 |
| 2017/0154224 A1* | 6/2017 | Torii .................... G06T 3/60 |
| 2018/0211300 A1* | 7/2018 | Tovey .................. G06T 7/62 |
| 2018/0307891 A1 | 10/2018 | Hayashi |
| 2018/0330196 A1* | 11/2018 | Chaubard ............ G06F 15/76 |
| 2020/0079412 A1 | 3/2020 | Ramanathan et al. |
| 2020/0151692 A1 | 5/2020 | Gao et al. |
| 2021/0027485 A1* | 1/2021 | Zhang .................. G06T 7/11 |
| 2021/0097567 A1 | 4/2021 | Balasubramaniam et al. |
| 2022/0147963 A1 | 5/2022 | Nagano et al. |
| 2022/0189265 A1* | 6/2022 | Yamazaki ........... G06V 40/107 |
| 2023/0101001 A1* | 3/2023 | Ushijima ............. G06T 7/0008 |
| | | 382/103 |
| 2023/0368625 A1* | 11/2023 | Sanil .................... G07G 3/003 |

* cited by examiner

FIG.3
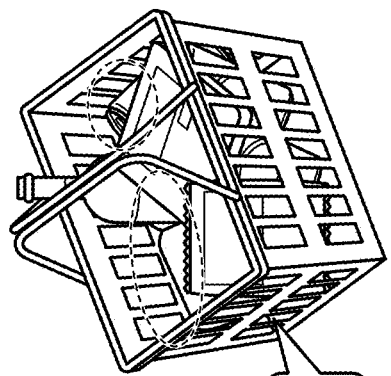
ITEMS SEEN: 2
(CORRECT: 4)
* HIDDEN BEHIND OTHER ITEMS
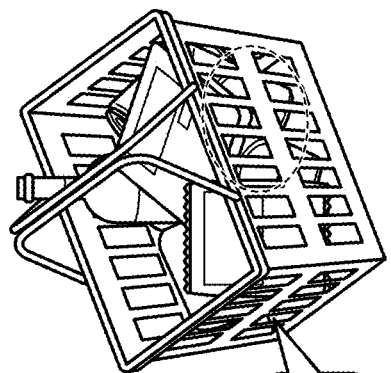
ITEMS SEEN: 4
(CORRECT: 7)
* HIDDEN BEHIND SIDE OF BASKET

| ITEM NAME | NUMBER OF ITEMS | PRICE |
|---|---|---|
| ○○○○○ | 1 | 398 |
| △△△△△ | 1 | 298 |
| ××××× | 2 | 148 |
| ... | ... | ... |

FIG.11
| CAMERA IMAGE | HOW BASKET AND ITEMS ARE SEEN |
|---|---|
| 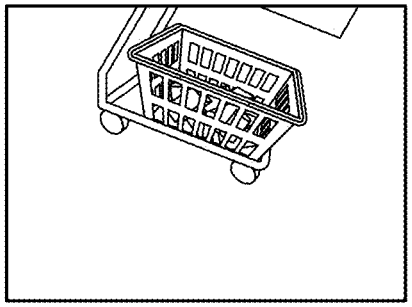 | 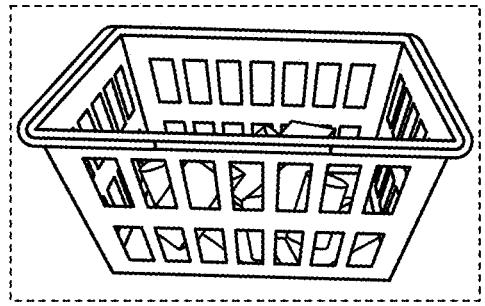 |
| 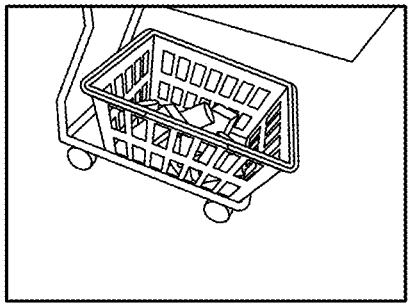 | 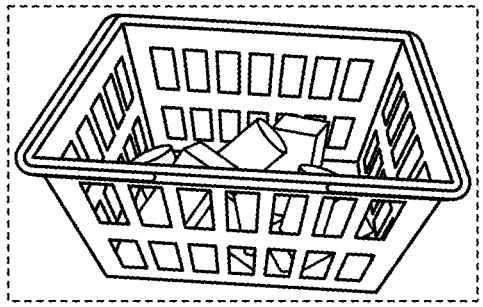 |
| 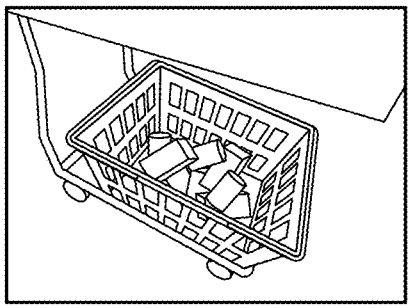 |  |

COMPUTER-READABLE RECORDING MEDIUM, INFORMATION PROCESSING METHOD, AND INFORMATION PROCESSING APPARATUS

CROSS-REFERENCE TO RELATED APPLICATION(S)

This application is based upon and claims the benefit of priority of the prior Japanese Patent Application No. 2022-109953, filed on Jul. 7, 2022, the entire contents of which are incorporated herein by reference.

FIELD

The embodiments discussed herein are related to a computer-readable recording medium, an information processing method, and an information processing apparatus.

BACKGROUND

In a retail store, in order to eliminate long lines at the checkout, a system in which a customer personally register items by scanning the items and pays for the items is increasingly being introduced. Furthermore, in recent years, introduction of a system in which a customer scans items using an application that is installed in a terminal device that is lent in a retail store or a terminal device that the customer possesses has been started. In such a system in which a customer personally scans items, it is necessary to sense failing in scanning items in order to sense fraudulent behaviors, such as shoplifting, and errors.

On the other hand, for example, a system that senses suspicious behaviors of customers and fraudulent behaviors, such as shoplifting, using a monitoring camera in a store is under development as a system that senses fraudulent behaviors of customers in a retail store. There is also a technique of sensing fraudulent behaviors and errors by specifying the number of items in a shopping basket from a video of a monitoring camera and comparing the specified number of items and items information on the items purchased by the customer with each other.

Patent Literature 1: U.S. Pat. No. 8,448,858
Patent Literature 2: U.S. Patent Publication No. 2016/0189277
Patent Literature 3: Japanese Laid-open Patent Publication No. 2020-135422
Patent Literature 4: Japanese Laid-open Patent Publication No. 2013-041354

SUMMARY

According to an aspect of an embodiment, a non-transitory computer-readable recording medium stores therein an information processing program that causes a computer to execute a process including, acquiring an image of an object storing items that is captured, extracting an object region of the object contained in the image by analyzing the image acquired, extracting one or more item regions contained in the extracted object region by analyzing the image acquired, estimating an item volume of the items stored in the object based on a position of an outline of the item region with respect to a position of the extracted object region, and specifying a number of items stored in the object based on the specified item volume.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a problem in detecting items;
FIG. 11 is a diagram illustrating an example of a difference in how a basket and items are seen depending on the position of the basket according to Example 1.

DESCRIPTION OF EMBODIMENTS

Preferred embodiments of the present invention will be explained with reference to accompanying drawings. Note that the examples do not limit the present embodiment and each example can be combined as appropriate within the scope without inconsistency.

Figure 1:
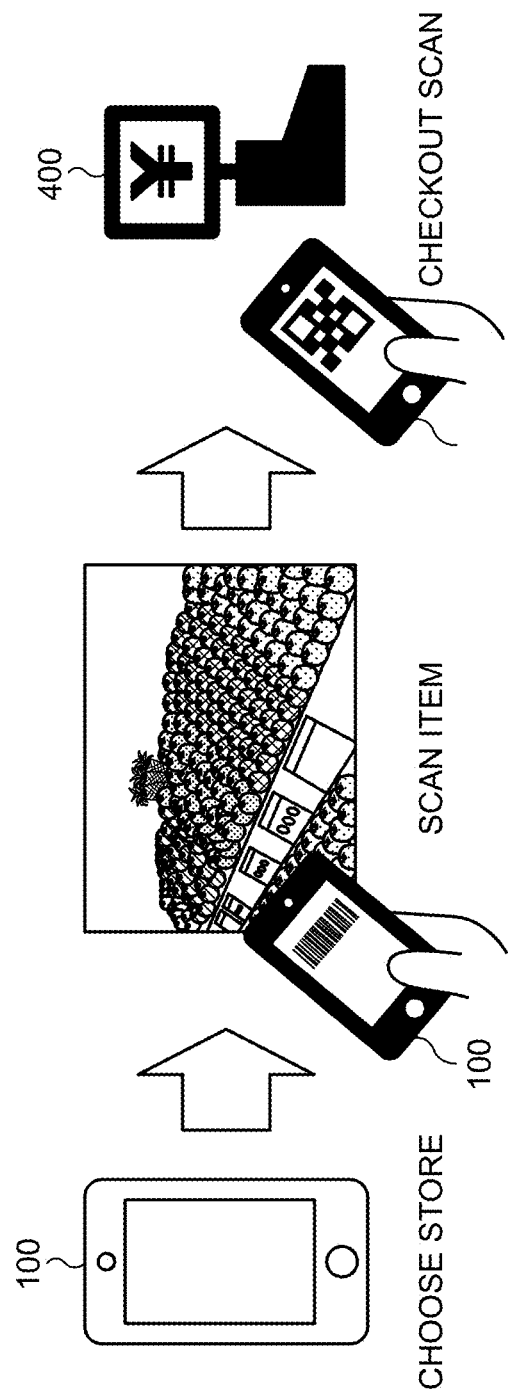
FIG. 1 is a diagram illustrating an example of purchasing items by self-scan.

First of all, using FIG. 1, a method enabling a customer to personally register items by scanning the items (sometimes "self-scan" below) and purchase the items will be described. FIG. 1 is a diagram illustrating an example of purchasing items by self-scan.

As illustrated in FIG. 1, first of all, a customer chooses a store that the customer is visiting via an application for registering items by scanning the items, which is an application displayed on a user terminal device 100. The application is installed in the user terminal device 100 in advance. The user terminal device 100 may be a mobile terminal device, such as a smartphone that the customer carries, or a dedicated terminal device that is lent to the customer in the store. In the case of the dedicated terminal device that is lent in the store, the customer need not choose a store and the store may be chosen in advance.

The customer picks items to purchase and, for example, reads a barcode and a two-dimensional code of each item that is attached to the item or a store shelf, using the user terminal device 100 (sometimes referred to as "items-scan" below). Accordingly, the items to purchase are registered in the application.

The customer then scans a payment code that is displayed on a display unit of a self-checkout terminal device 400, or the like, using the user terminal device 100. The customer then pays the amount that is displayed on a check-out screen on the self-checkout terminal device 400, so that purchasing items completes.

Purchasing items by self-scan has been described using FIG. 1. As for self-scan, however, for example, a customer can be spared from paying for items by putting the items in a basket without scanning the items and not making a payment with the self-checkout terminal device 400. Alternatively, a customer can be spared from paying for part of items to purchase in a way that the customer scans only part of the items and pays for only the scanned items at the self-checkout terminal device 400. Particularly, fraudulent behaviors with a small number of items are easy for store staffs to find; however, for example, the case where the number of items is large and part of the items is not scanned is difficult for store staffs to find.

There is thus a technique of specifying the number of items in a shopping basket from a video of a monitoring camera and comparing the specified number of items and item information on items that are purchased by a customer with each other, thereby sensing fraudulent behaviors and errors.

Figure 2:
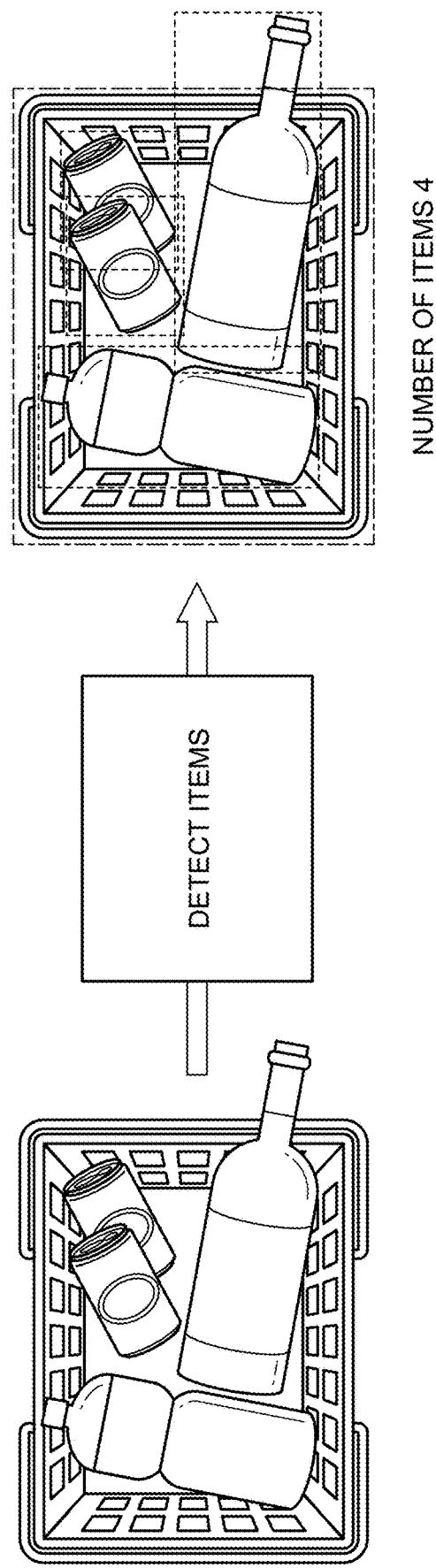
FIG. 2 is a diagram illustrating an example of detecting items.

FIG. 2 is a diagram illustrating an example of detecting items. As illustrated in FIG. 2, for example, it is possible to detect a shopping basket and items from a video of a monitoring camera, using an existing object detection algorithm. The existing object detection algorithm is, for example, an object detection algorithm using deep learning, such as Faster R-CNN (Regions with Convolutional Neural Network). Alternatively, the algorithm may be an object detection algorithm, such as YOLO (You Only Look Once) or SSD (Single Shot Multibox Detector) or DETR (DEtection TRansformer). Counting the number of the detected items in the shopping basket makes it possible to specify the number of items that are stored in the shopping basket.

FIG. 2 exemplifies a video of a shopping basket that is shot from above, however, depending on the position of a monitoring camera or the shopping basket, a video may be shot from a side of the shopping basket or from diagonally above and thus there may be an item that is hidden behind the side of the shopping basket or another item and is not seen. In this case, an error may occur in specifying the number of items in a shopping basket from a video of the monitoring camera.

FIG. 3 is a diagram illustrating an example of problems in detecting items. In the example on the left in FIG. 3, seven items are stored in a shopping basket but there are items that are hidden behind a side of the basket and, for example, the number of items may be specified as a number smaller than 7 according to a video that is shot from the side of the shopping basket. In the example on the right in FIG. 3, four items are stored in a shopping basket but there are items that are hidden behind other items and the number of items may be specified as a number smaller than 4. Thus, an object of the present embodiment is to estimate a volume of items in a basket in consideration of items that are hidden behind the side of the shopping basket or other items and specify the number of items in the shopping basket more accurately.

EXAMPLE 1

Figure 4:
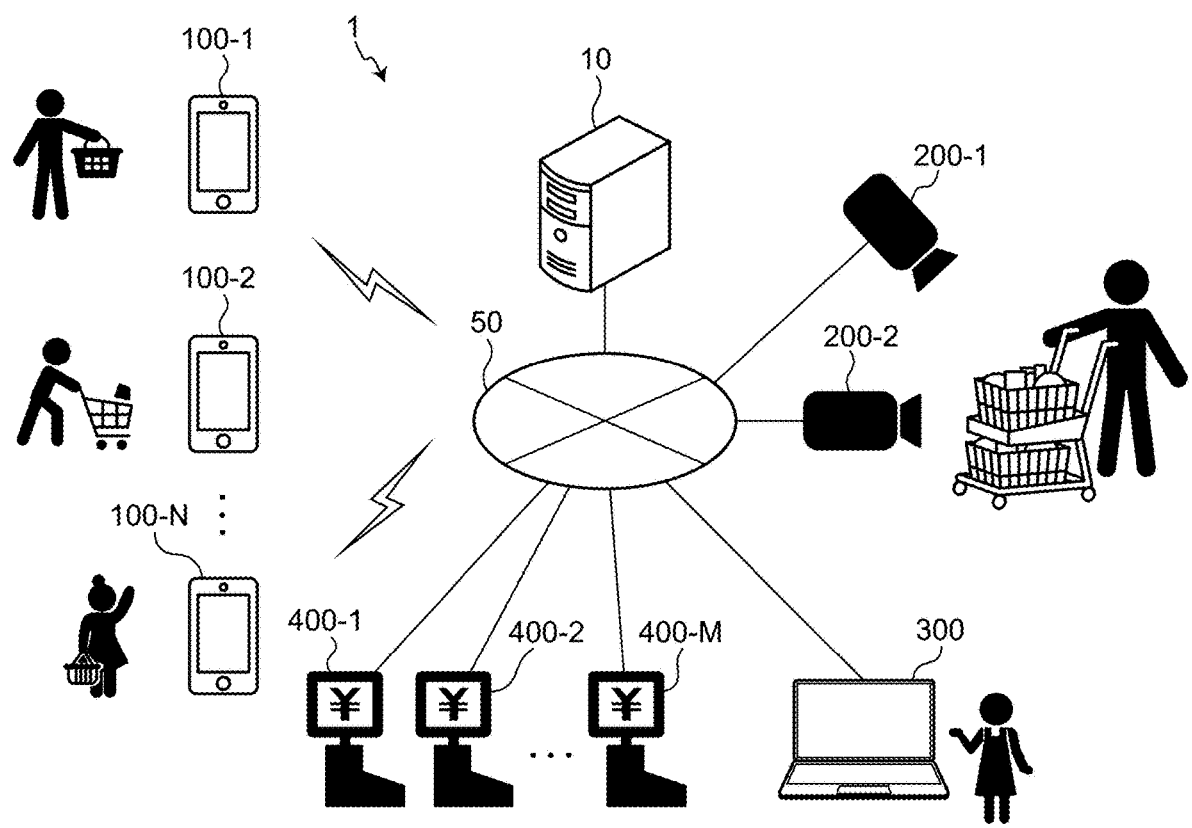
FIG. 4 is a diagram illustrating an example of a configuration of an information processing system according to Example 1.

First of all, an information processing system for carrying out the present embodiment will be described. FIG. 4 is a diagram illustrating an example of a configuration of an information processing system according to Example 1. As illustrated in FIG. 4, an information processing system 1 is a system in which an information processing device 10 and user terminal devices 100-1 to 100-N (collectively referred to as "a user terminal 100" below and N is any integer) are connected via a network 50 such that mutual communications are enabled.

The information processing device 10 is also connected to camera devices 200-1 and 200-2 (collectively referred to as "a camera device 200" below) and a store staff terminal device 300 via the network 50 such that mutual communications are enabled. Furthermore, the information processing device 10 is also connected to self-checkout terminal devices 400-1 to 400-M (collectively referred to as "a self-checkout terminal device 400" below and M is an integer) via the network 50 such that mutual communications are enabled.

For example, various communication networks, such as an intranet that is used in a retail store, can be employed as the network 50 regardless whether the networks are wired or wireless. The network 50 need not be a single network and, for example, may be configured in a way that an intranet and the Internet are configured via a network device, such as a gateway, and other devices (not illustrated in the drawing). Note that "in the retail store" is not limited to "in the building" and it covers "outside the building within the premises".

The information processing device 10 is set in, for example, a retail store and is an information processing device, such as a desktop personal computer (PC) or a laptop PC that is used by a store staff or a manager or a server computer.

The information processing device 10, for example, receives a plurality of captured images that are captured by the camera device 200 from the camera device 200. Note that the captured images are a video that is shot by the camera device 200, that is, a series of frames of a moving image.

For example, using an existing object detection technique, the information processing device 10 detects a customer who stays in a store (sometimes simply referred to as "a person" below), a shopping basket (sometimes simply referred to as "a basket" below) that the person holds, and items from a captured image. As for detection of objects, such as items, from a captured image, for example, a given area on the captured image, such as a bounding box that is a rectangular region surrounding an object, such as an item, may be detected with respect to each object. For example, based on the basket and the items that are detected from the captured image, the information processing device 10 calculates the number of items that are stored in the basket.

The information processing device 10 specifies the self-checkout terminal device 400 with which the person makes a payment, for example, based on position information on the person and position information on each of the self-checkout terminal devices 400-1 to 400-M. Based on the difference between the number of items that are stored in the basket and the number of items to be purchased that are registered in the self-checkout terminal device 400, the information processing device 10 determines whether there is an unregistered item that is not registered in the self-checkout terminal device 400 as an item to be purchased. When there is an unregistered item, the information processing device 10 notifies the store staff terminal device 300 of an alert.

FIG. 4 illustrates the information processing device 10 as a single computer; however, the information processing device 10 may be a decentralized computing system consisting of a plurality of computers. Alternatively, the information processing device 10 may be a cloud computer device that is managed by a service provider that provides cloud computing services.

The user terminal device 100 is, for example, an information processing terminal device for a customer to personally register an item to be purchased by scanning a barcode, or the like, of the item in order to purchase the item. The user terminal device 100 may be a mobile terminal device, such as a smartphone or a tablet PC that the customer owns, or may be a dedicated terminal device that is lent in the store. An application for registering items by scanning the items is installed previously in the user terminal device 100.

Using the user terminal device 100, the customer, for example, registers items to be purchased in the user terminal device 100 by scanning a barcode of each item that is attached to the item or a store shelf. When paying for the items, the customer, for example, causes the self-checkout terminal device 400 or a code reader (not illustrated in the drawing) that is set at the entry of a self-checkout area in which the self-checkout terminal device 400 is set to read a two-dimensional code that is displayed on the user terminal device 100, or the like. Accordingly, item information on the items to be purchased is registered in the self-checkout terminal device 400 or the information processing device 10.

The camera device 200 is a monitoring camera that is set in a retail store or the premises of the retail store. The camera device 200 may include the camera device 200-1 for shooting a video of a shopping basket from above and the camera device 200-2 for shooting a video of the shopping basket from a side. Particularly when, a shopping cart on which shopping baskets can be placed on upper and lower two trays is used as illustrated in FIG. 4, an image of the shopping basket placed on the lower tray is shot by the camera device 200-2 that shoots a video from a side because it is difficult to shoot a video of the shopping basket on the lower tray with the camera device 200-1 that shoots a video from above. The camera device 200 may be set at the entry of the self-checkout area in which the self-checkout terminal device 400 is set or a place where shopping baskets are placed for each self-checkout terminal device 400. A video that is shot by the camera device 200 is transmitted to the information processing device 10.

The store staff terminal device 300 may be a mobile terminal device, such as a smartphone or a tablet PC that a store staff of the retail store has, or may be an information processing device, such as a desktop PC or a laptop PC that is set in a given position in the store. When the information processing device 10 senses omission of scanning an item resulting from a fraudulent behavior or an error, the store staff terminal device 300 receives an alert from the information processing device 10. Note that, for example, while there may be a plurality of the store staff terminal devices 300 for the respective store staffs in the store, the terminal device that is notified of the alert may be limited to a terminal that a shop staff who is in charge of security around the self-checkout area has.

The self-checkout terminal device 400 is a self-checkout terminal device for a customer to personally make a payment to items. The self-checkout terminal device 400 is receives information on items to be purchased that are registered via the user terminal device 100. The self-checkout terminal device 400 receives a payment for the items to be purchased from the customer by cash, credit card, or cashless payment.

Functional Configuration of Information Processing Device 10

Figures 5, 6:
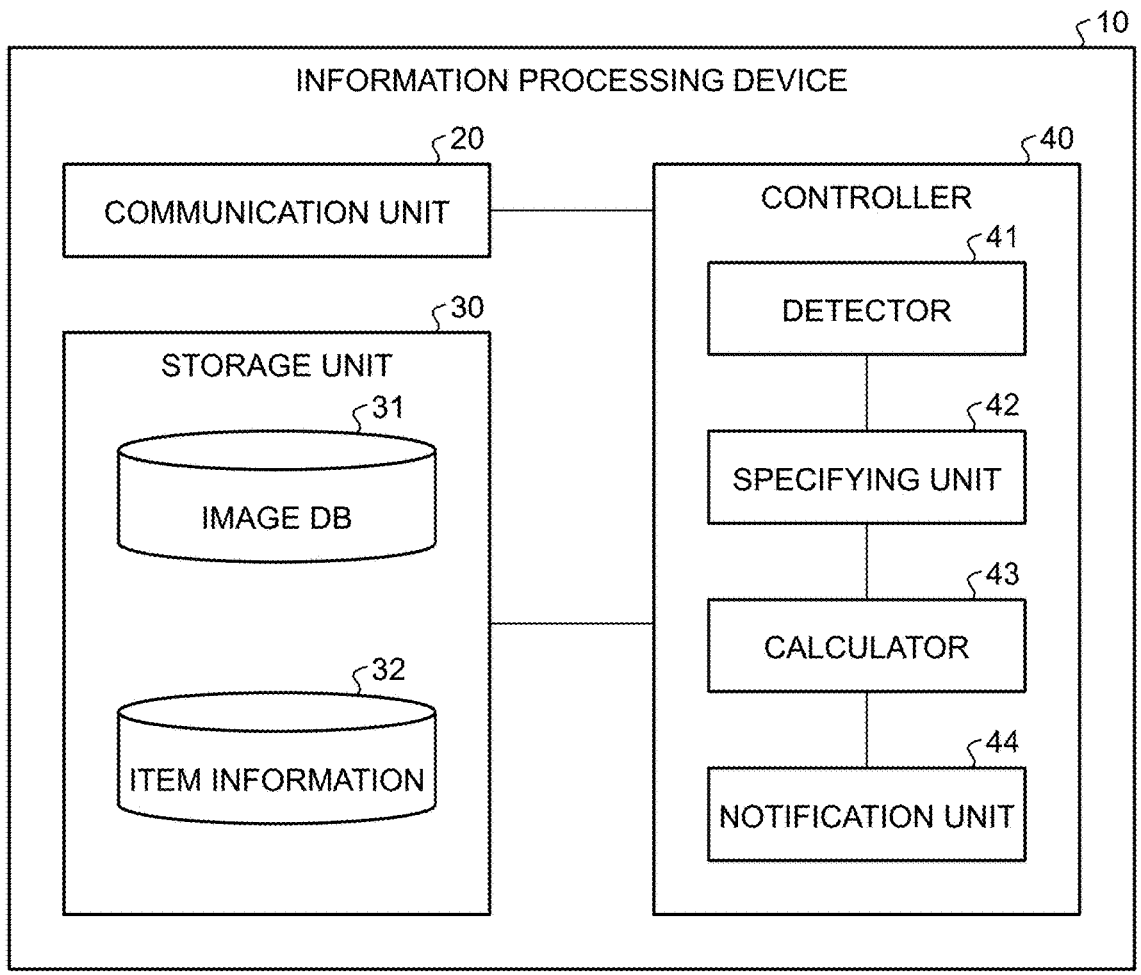
FIG. 5 is a diagram illustrating an example of a configuration of an information processing device 10 according to Example 1.
FIG. 6 is a diagram illustrating an example of data that is stored in item information 32 according to Example 1.

A functional configuration of the information processing device 10 will be described next. FIG. 5 is a diagram illustrating an example of a configuration of the information processing device 10 according to Example 1. As illustrated in FIG. 5, the information processing device 10 includes a communication unit 20, a storage unit 30, and a controller 40.

The communication unit 20 is a processing unit that controls communications with other information processing devices, such as the user terminal device 100 and the camera device 200. The communication unit 20 is, for example, a communication interface, such as a USB (Universal Serial Bus) interface or a network interface card.

The storage unit 30 has a function of storing various types of data and a program that the controller 40 executes and the storage unit 30 is realized using, for example, a storage device, such as a memory or a hard disk. The storage unit 30 stores an image DB 31, item information 32, etc.

The image DB 31 stores a plurality of captured images that are captured by the camera device 200 and that are a series of frames. The captured images that are stored in the image DB 31 are images that are captured by the camera device 200 and that are transmitted to the information processing device 10 and an identifier that uniquely identifies the camera device 200 that captures the image, the date at which the image is captured, etc., may be stored in the image DB 31. The image DB 31 is capable of storing information on positions of objects, such as a person, a shopping basket and items, that are specified with respect to the captured image in the image.

The item information 32 stores information on the items to be purchased that are registered by self-scan. FIG. 6 is a diagram illustrating an example of data that is stored in item information 32 according to Example 1. As illustrated in FIG. 6, the item information 32 stores "item name" representing the name of an item that is registered by self-scan, "the number of items" representing the number of items per product, "price" representing the price of the item, etc., in association with one another. In addition to or instead of "item name", "type of item" representing the type of the item that is registered by self-scan may be stored. An identifier of the captured image of the registered item can be stored in the item information 32 and can be linked with the captured image that is stored in the image DB 31.

The above-described information that is stored in the storage unit 30 is an example only and the storage unit 30 is capable storing various types of information in addition to the above-described information.

The controller 40 is a processing unit that controls the entire information processing device 10 and is, for example, a processor. The controller 40 includes a detector 41, a specifying unit 42, a calculator 43, and a notification unit 44. Each of the processing units is an example of an electronic circuit that the processor includes or an example of a process that the processor executes.

For example, by analyzing the image of the basket storing the items that is captured with the camera device 200, the detector 41 extracts a basket region of the basket that is contained in the image. For example, by analyzing the image, the detector 41 extracts at least one item region that is contained in the extracted basket region. Note that extraction of the regions of the basket and item from the image may be performed using existing object detection, such as Faster R-CNN or YOLO.

Figure 7:
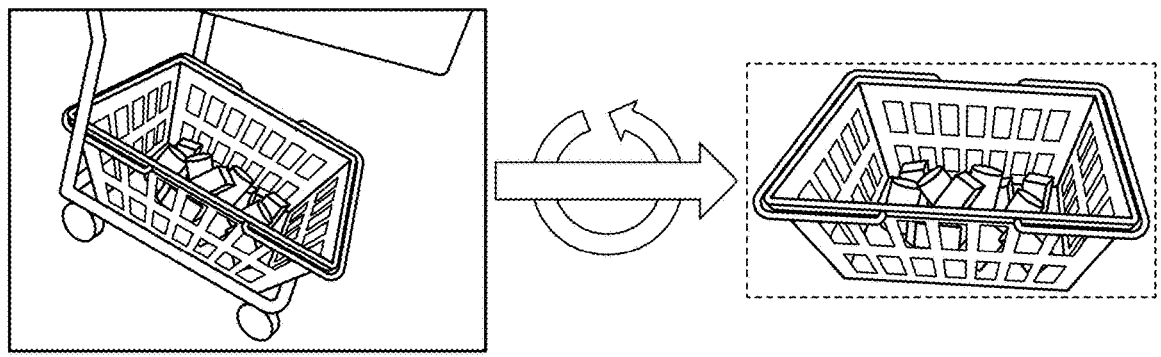
FIG. 7 is a diagram illustrating an example of basket region rotational correction according to Example 1.

For example, when extracting the basket region, the detector 41 may execute rotational correction on the captured image of the basket to make a correction such that the sides of the basket are horizontal on the image. FIG. 7 is a diagram illustrating an example of basket region rotational correction according to Example 1. As illustrated in FIG. 7, the detector 41 may extract the basket region after rotating the whole image by a given angle.

Figure 8:
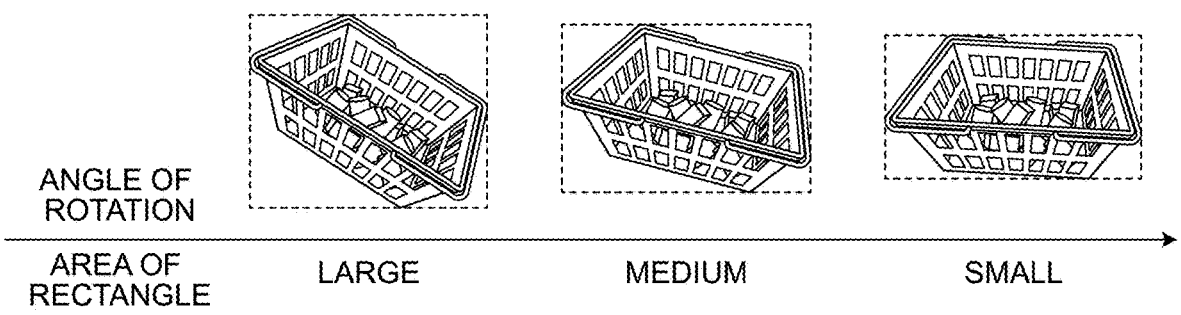
FIG. 8 is a diagram illustrating another example of the basket region rotational correction according to Example 1.

FIG. 8 is a diagram illustrating another example of the basket region rotational correction according to Example 1. In the example according to FIG. 8, the detector 41 rotates the image by a plurality of given angles, employs the smallest rectangular region that is detected, and extracts the employed rectangular region as the basket region.

Figure 9:
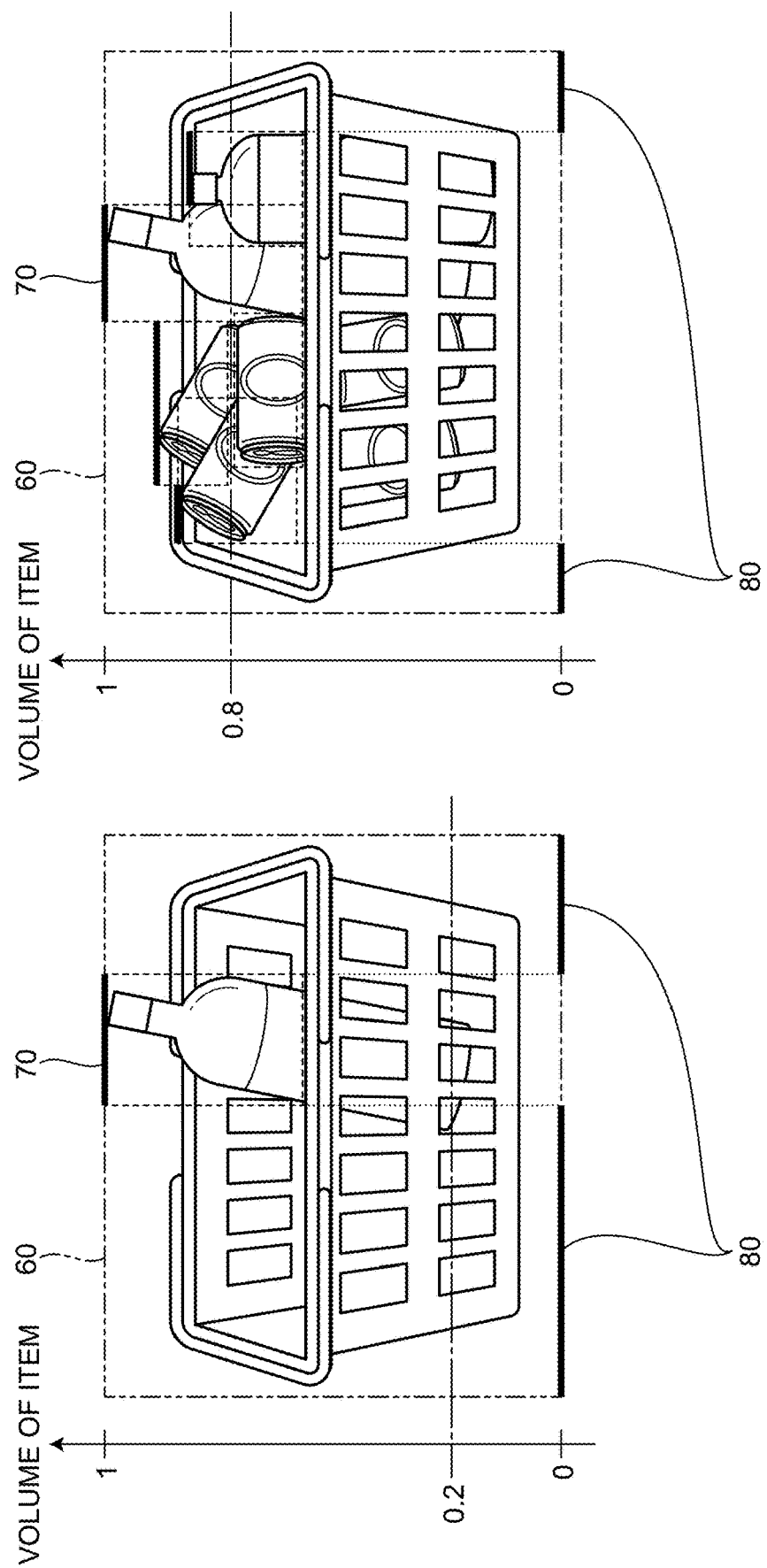
FIG. 9 is a diagram illustrating an example of estimating a volume of items in the basket according to Example 1.

The specifying unit 42, for example, specifies a position of an outline of an item region with respect to the basket region that is detected by the detector 41. FIG. 9 is a diagram illustrating an example of estimating a volume of items in the basket according to Example 1. As illustrated in FIG. 9, the item region that is extracted by the detector 41 may be a region of a part that is seen excluding the part hidden behind the basket.

As illustrated on the left in FIG. 9, the specifying unit 42 specifies a position of an outline of an item region 70 of an item with respect to a basket region 60 of the basket. This is, for example, as illustrated on the left in FIG. 9, specifying a position of a top side of the outline of the item region 70 with a top side of the basket region 60 being set for 1 and a bottom side being set for 0. A no-item region 80 without an item is specified as the bottom side of the basket region 60. The specifying unit 42, for example, estimates an average of the top sides of the item region 70 and the no-item region 80 that is 0.2 in the example on the left in FIG. 9 as a volume of the item in the basket.

As illustrated on the right in FIG. 9, even when there are multiple items in the basket, as in the case illustrated on the left in FIG. 9, the specifying unit 42 estimates an average of the top sides of each item region and a region without an item that is 0.8 in the example on the right in FIG. 9 as a volume of the items in the basket. Note that, as illustrated in FIG. 10, also when the item regions 70 are extracted not by bounding boxes but by instance segmentation, the specifying unit 42 is capable of specifying a volume of the items in the basket based on positions of outlines of the item regions 70 with respect to the basket region 60.

Figure 10:
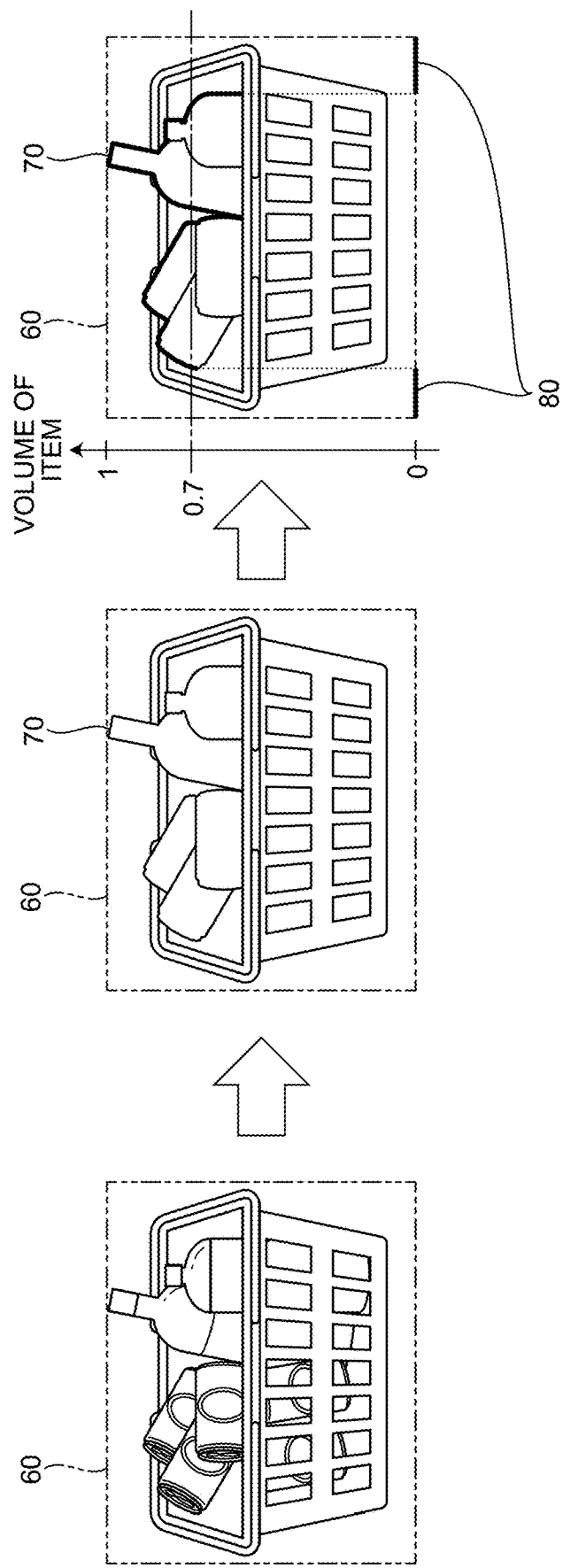
FIG. 10 is a diagram illustrating another example of estimating a volume of items in the basket according to Example 1.

FIG. 10 is a diagram illustrating another example of estimating a volume of items in the basket according to Example 1. For example, in the example according to FIG. 10, as illustrated at the center in FIG. 10, the specifying unit 42 masks and extracts the item regions 70 by instance segmentation. Even in this case, as illustrated on the right in FIG. 10, for example, an average of the top sides of the item regions 70 and the no-item region 80 can be estimated as a volume of the items.

When estimating a volume of the items, the specifying unit 42 may correct and then estimate a volume of the items according to how the basket and the items are seen in the camera image. FIG. 11 is a diagram illustrating an example of a difference in how a basket and items are seen depending on a position of the basket according to Example 1. The three camera images on the left in FIG. 11 are images of the same basket placed on the lower tray of the shopping cart that are captured by the same camera device 200-2. As illustrated in FIG. 11, because the position of the shopping cart differs among these three camera images, how the basket and the items stored in the basket are seen differs. As illustrated on the right in FIG. 11, also when a basket region of the basket is extracted from each of the three camera images, how the basket and the items stored in the basket are seen differs. For this reason, a difference may occur also in the estimation of a volume of items described using FIGS. 9 and 10 depending on how the basket and the items stored in the basket are seen. For this reason, in the present embodiment, a volume of the items is corrected and then estimated according to how the basket and the items are seen in the camera images.

Figure 12:
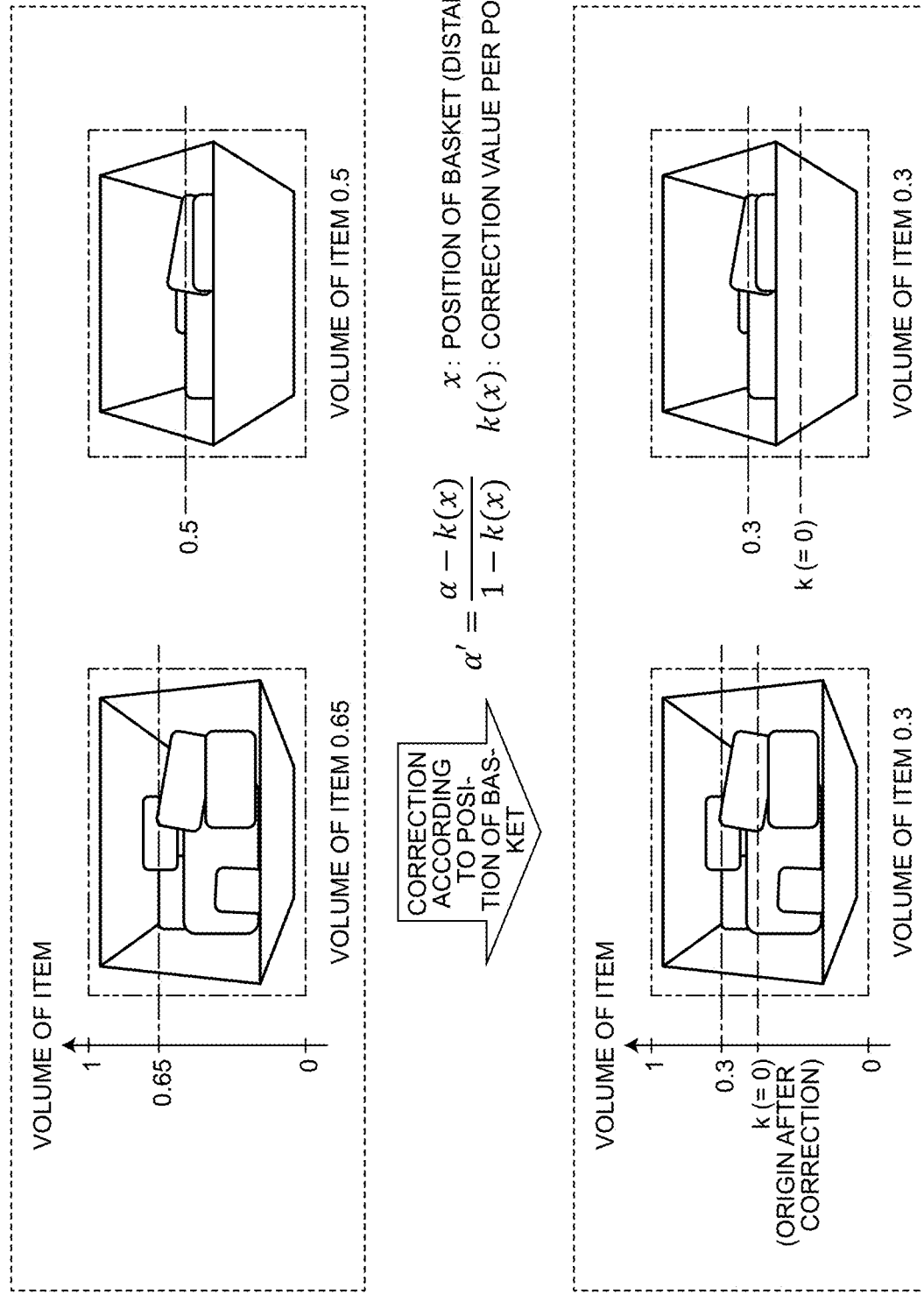
FIG. 12 is a diagram illustrating an example of correcting a volume of items according to a position of a basket according to Example 1.

FIG. 12 is a diagram illustrating an example of correcting a volume of items according to a position of a basket according to Example 1. The upper views in FIG. 12 present sets of a basket and items on which 0.65 and 0.5 that are amounts of the items are estimated, respectively, by the estimation of a volume of items described using FIGS. 9 and 10. The sets of a basket and items on which the amounts items of 0.65 and 0.5 are estimated are however the same set of a basket and items. The specifying unit 42 therefore corrects the volume of the items according to the position of the basket, for example, using Equation (1) below.

$$\alpha' = \frac{\alpha - k(x)}{1 - k(x)} \quad (1)$$

In Equation (1), α denotes a volume of items before correction and α' denotes a volume of items after correction. Furthermore, x denotes a position of a basket that is, for example, a distance from a given reference to a center point of the basket in a camera image or a set of coordinates on the camera image. Furthermore, k(x) denotes a correction value according to each position of the basket.

Using Equation (1) corrects the position of the basket corresponding to the volume of items of 0, that is, the origin as the lower views in FIG. 12 present and accordingly the volume of the items is corrected. For this reason, also as for the values according to which the volumes of the items of 0.65 and 0.5 are estimated, corrections to volumes of the items of 0.3 and 0.3 are made, respectively. Note that, as described below, the volume of the items that is estimated by estimation of a volume of items like that illustrated using FIGS. 9 to 12 is then converted by the calculator 43 to the number of items.

Back to description of FIG. 5, the specifying unit 42, for example, specifies a first self-checkout terminal device 400 that a first person with a basket uses from a second image of an area containing the self-checkout terminal device 400, which is captured with the camera device 200. The specifying unit 42, for example, receives item information on items to be purchased from the first self-checkout terminal device 400 and, based on the item information, specifies a third number of items to be purchased. The item information 32 that is received from the first self-checkout terminal device 400 is information that is generated in a way that the user terminal device 100 that is an information processing terminal device that the first person uses scans and then registers barcodes or two-dimensional codes that are assigned to the items.

Based on the number of items that is calculated based on the specified position of the outline of the item region like that illustrated using FIGS. 9 to 12 and the third number, the specifying unit 42 then determines whether there is an item that is not registered as an item to be purchased in the self-checkout terminal device 400.

The specifying unit 42 also specifies a personal item of the first person with the basket that are contained in the extracted basket region. To specify a personal item as described above, for example, a machine learning model that is generated using an existing machine learning technique by performing training such that a customer's own shopping bag or a bag is detected previously as a personal item from a captured image may be used. An object that is specified as a personal item is not detected as an item and is excluded from subjects on which an item region is extracted and a volume and the number of items are calculated.

The specifying unit 42, for example, specifies the type of the item contained in the extracted basket region. Also for the specifying, for example, items may be detected from a captured image using an existing machine learning technique and a machine learning model that is generated by performing training such that the type of the detected item is output may be used.

The calculator 43, for example, calculates the number of the items stored in the basket based on the specified position of the outline of the item region. For example, the volume of items that is estimated by estimation of a volume of items like that described using FIGS. 9 to 12 is multiplied by a conversion factor, such as 20, thereby being converted into the number of items. More specifically, when the estimated volume of items is 0.3, the number of items is (conversion factor)×(volume of items)=20×0.3=6. Note that conversion into the number of items may be, for example, a conversion of (number of items)=f(volume of items) using a non-linear function f(x) or may be a conversion using an estimation system, such as a random forest using decision trees. The number of items may be calculated further based on the type of the item contained in the basket region, which is the type specified by the specifying unit 42.

For example, when the basket contains a large item, such as toilet paper or a set of boxes of tissue, there is a tendency that the number of extracted rectangular regions of the items is small and the area of one rectangular region is large. For this reason, a system like that described using FIGS. 9 to 12 may estimate a larger volume of items and resultantly estimate the larger number of items than the actual ones. Thus, also using information on the rectangles of the items in a visible area, for example, the number of or the size of the rectangles, for a conversion to the number of the items makes it possible to reduce errors in the estimation. In other words, the calculator 43 calculates the size of the rectangular regions of the items in the image and calculates a second number of the items extracted from the image. For example, based on the sizes of the regions and the second number of the items that are calculated and the positions of the outlines of the item regions that are specified by the specifying unit 42, the calculator 43 calculates the number of the items stored in the basket. More specifically, the calculator 43, for example, calculates the number of the items using Equations (2) to (4) below.

$$(\text{Number of items}) = k1 \times (\text{estimated volume of items}) + \quad (2)$$
$$k2 \times (\text{number of rectangular regions of respective items}) +$$
$$k3 \times (\text{average of areas of rectangular regions of respective items})$$

$$(\text{Number of items}) = k1 \times (\text{estimated volume of items}) + \quad (3)$$
$$k2 \times (\text{number of rectangular regions of respective items}) +$$
$$k3 \times (\text{average of areas of } N \text{ rectangular regions in descending order in size})$$

$$(\text{Number of items}) = k1 \times (\text{estimated volume of items}) + \quad (4)$$
$$k2 \times (\text{number of rectangular regions of respective items}) +$$
$$k3 \times (\text{areas of largest rectangular region}) +$$
$$k4 \times (\text{area of second largest rectangular region}) + \ldots$$

In Equations (2) to (4), k1, k2 and k3 denote weight coefficients for the volume of items, the number of rectangular regions of the respective items, and an average of the areas of the rectangular regions of the respective items, respectively. The average of the areas of the rectangular regions of the respective items may be calculated using the areas of all the rectangular regions of the items that are extracted from the image as presented by Equation (2) or may be calculated using the areas of N rectangular regions in a descending order in size of area as presented by Equation (3). The average of the areas of the rectangular regions of the respective items may be calculated using the areas of N rectangular regions in the descending order in size of area as other explanatory variables as presented by Equation (4). The (number of rectangular regions of respective items) segment in Equations (2) to (4) may be "k2× max(0,M-number of rectangular regions of respective items)". This is, for example, to make a correction only in the case where the number of the rectangular regions of the respective items is smaller than a given number M with a high possibility that there is a large item. More specifically, for example, when M=4 is set, max(0,a) is corrected and calculated as a if a>0 and is calculated as 0 without correction if a≤0. The number of items may be calculated by, instead of such a liner regression, a method using a non-linear function or a method using decision trees.

A method of calculating the number of items using a machine learning model will be described here. The number of items that are stored in a basket is specified by inputting at least one of the volume of the items, the areas of rectangular regions of the items, and the number of the rectangular regions of the items to a trained machine learning model.

For example, the trained machine learning model is a machine learning model with a parameter of a neural network being changed such that an error between an output result that the neural network outputs when an explanatory variable that is the volume of items is input to the neural network and truth data that is a label of the number of the items is reduced.

The trained machine learning model may be a machine learning model with a parameter of a neural network being changed such that an error between an output result that the neural network outputs when explanatory variables that are the volume of items, areas of bounding boxes, and the number of the bounding boxes are input to the neural network and truth data that is a label of the number of the items is reduced. The areas of the bounding boxes may be the areas of image regions of the items stored in the basket that are contained in the image and are specified from the rectangular regions of the respective items contained in the image. The number of the bounding boxes may be a total of the rectangular regions of the items that are specified from the number of the rectangular regions of the items.

Back to FIG. 9, a method of specifying a volume of items using bounding boxes will be described here. For example, R-CNN or SSD is used for bounding boxes. R-CNN combines rectangular regions with features of a convolutional neural network and detects a subset of an area (region proposal). CNN features are then extracted from the region proposal. A support vector machine that is trained previously using the CNN features adjusts the bounding boxes of the region proposal.

SSD is an algorithm of general object sensing using machine learning and determines bounding boxes from rectangular regions referred to as default boxes. Multiple default boxes in different sizes are layered on a single image and a prediction value is calculated per box. It is possible to predict, with respect to each of the default boxes, a position presenting how far the default box is from an object and how the default box is different from the object in size.

The detector 41 specifies, from the image, a first bounding box of each item that surrounds the item and that is contained in the image. The detector 41 specifies a position of a lower border of a second bounding box.

The specifying unit 42 specifies a position of an upper border of the first bounding box of each item contained in the image. The specifying unit 42 specifies a position corresponding to all the items stored in the basket from the specified positions of the upper borders of the respective items contained in the image. Furthermore, the specifying unit 42 specifies a second bounding box surrounding the basket from the acquired image.

The calculator 43 specifies an item volume of the items that are stored in the basket based on the position corresponding to the entire items with respect to the position of the lower border. Furthermore, the calculator 43 further specifies the number of the items by inputting the item volume of the items to the trained machine learning model.

Flow of Process

Figure 13:
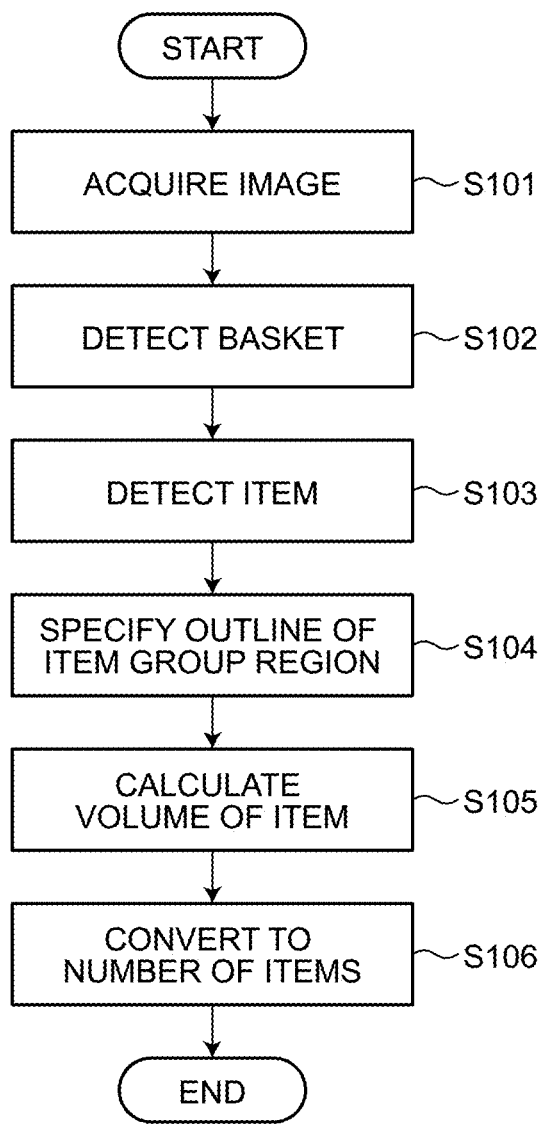
FIG. 13 is a flowchart illustrating an example of a flow of a number-of-items estimating process according to Example 1.

A flow of a number-of-items estimating process that is executed by the information processing device 10 will be described. FIG. 13 is a flowchart illustrating an example of the flow of the number-of-items estimating process according to Example 1. The number-of-items estimating process illustrated in FIG. 13 may be executed, for example, at given intervals or every time a captured image is received from the camera device 200.

First of all, as illustrated in FIG. 13, the information processing device 10, for example, acquires a captured image of a basket that is captured by the camera device 200 from the image DB 31 (step S101). Note that, in the number-of-items estimating process illustrated in FIG. 13, in order to process in real time the captured image, precisely, a monitoring video, that is captured by the camera device 200, captured images are transmitted as needed from the camera device 200 and are stored in the image DB 31.

For example, using an existing object detection algorithm, the information processing device then detects a shopping basket from the captured image that is acquired at step S101 (step S102). Note that, for detection of the shopping basket, a given region containing the shopping basket may be extracted by, for example, a bounding box, or the like.

For example, using an existing object detection algorithm, the information processing device 10 detects an item that is stored in the shopping basket that is detected at step S102 from the captured image that is acquired at step S101 (step S103). Also for detection of the item, a given region containing the item may be extracted by, for example, a bounding box, or the like.

The information processing device 10, for example, specifies an outline of a region of a group of the items that are detected at step S103 (step S104). This is, for example, as described using FIG. 9, specifying a position of a top side of the outline of the item region 70 with a top side of the basket region 60 being set for 1 and a bottom side being set for 0. As described using FIG. 9, the top side of the no-item region 80 may be specified as 0.

The information processing device 10, for example, calculates a volume of the items based on positions of the outlines of the region of the group of the items and the region without an item that are specified at step S104 (step S105).

The information processing device 10 then multiplies the volume of the items that is calculated at step S105 by a conversion factor, such as 20, thereby converting the volume of the items into the number of items (step S106). After step S106 is executed, the number-of-items estimating process illustrated in FIG. 13 ends.

Figure 14:
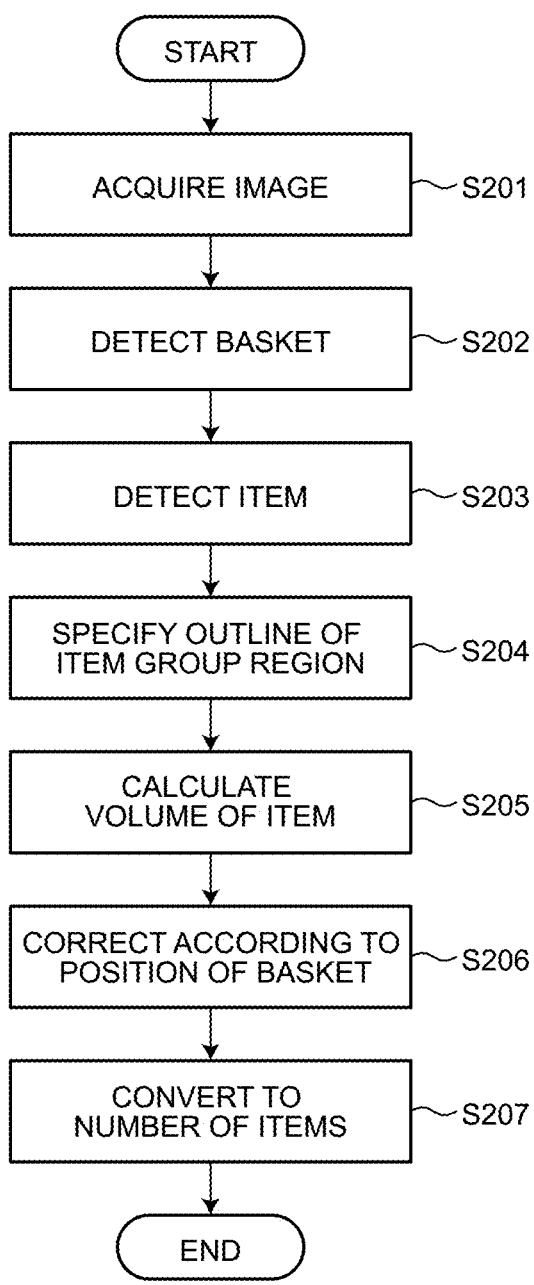
FIG. 14 is a flowchart illustrating another example of the flow of the number-of-items estimating process according to Example 1.

Using FIG. 14, a different number-of-items estimating process from the number-of-items estimating process illustrated in FIG. 13 will be described next along a flow of the process. FIG. 14 is a flowchart illustrating another example of the flow of the number-of-items estimating process according to Example 1. Steps S201 to S205 in the number-of-items estimating process illustrated in FIG. 14 are the same as steps S101 to S105 in the number-of-items estimating process illustrated in FIG. 13.

For example, as described using FIG. 12, using Equation (1), the information processing device 10 corrects the volume of the items that is calculated at step S205 according to the position of the basket (step S206).

The information processing device 10, for example, multiplies the volume of the items that is calculated at step S206 by a conversion factor, such as 20, thereby converting the volume of the items into the number of items (step S207). After step S207 is executed, the number-of-items estimating process illustrated in FIG. 14 ends.

Figure 15:
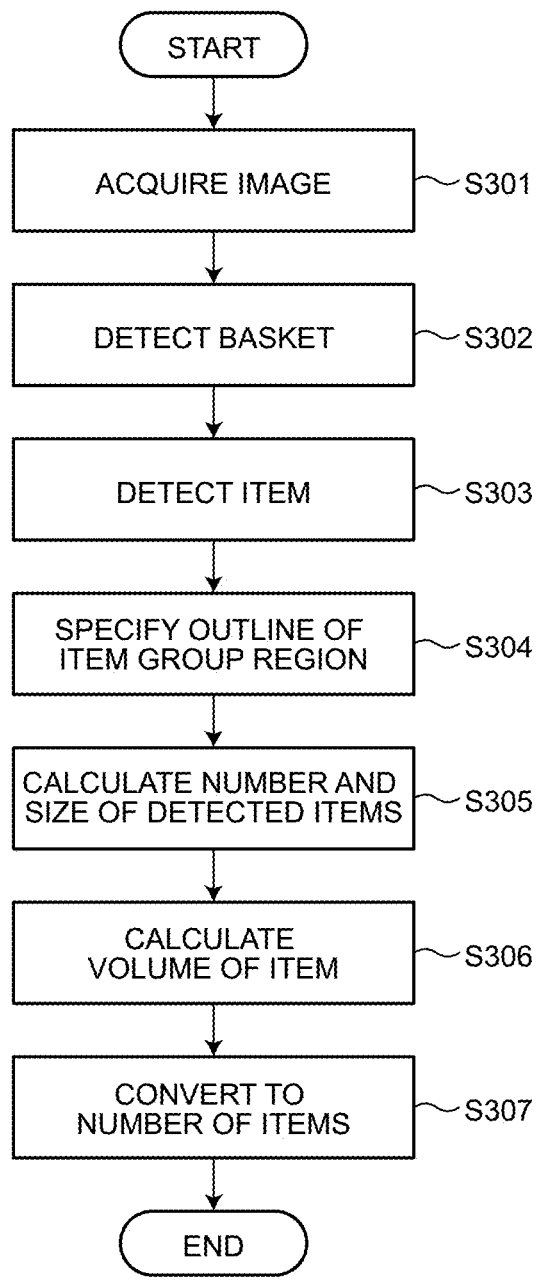
FIG. 15 is a flowchart illustrating still another example of the flow of the number-of-items estimating process according to Example 1.

Using FIG. 15, another different number-of-items estimating process from the number-of-items estimating processes illustrated in FIG. 13 and FIG. 14 will be described next along a flow of the process. FIG. 15 is a flowchart illustrating a still another example of the flow of the number-of-items estimating process according to Example 1. Steps S301 to S304 in the number-of-items estimating process illustrated in FIG. 15 are the same as steps S101 to S104 in the number-of-items estimating process illustrated in FIG. 13.

The information processing device 10 calculates the number of and size of the regions of the group of the items that are detected at step S303 (step S305).

The information processing device 10, for example, calculates a volume of the items based on positions of the outlines of the region of the group of the items and the region without an item that are specified at step S304 (step S306).

The information processing device 10 then, for example, converts the volume of the items that is calculated at step S306 into the number of the items using the number of and size of the regions of the group of the items that are calculated at step S305 and any one of Equations (2) to (4) (step S307). After step S307 is executed, the number-of-items estimating process illustrated in FIG. 15 ends.

Effects

As described above, the information processing device 10 acquires an image of a basket storing items that is captured, extracts a basket region of the basket that is contained in the image by analyzing the acquired image, extracts at least one item region contained in the extracted basket region by analyzing the acquired image, estimates an item volume of the items stored in the basket based on a position of an outline of the item region with respect to a position of the extracted basket region, and specifies the number of the item stored in the basket based on the specified item volume. When the number of items is calculated, it is possible to reduce the throughput of the information processing device 10.

In this manner, the information processing device 10 extracts regions of a shopping basket and items from a captured image and calculates the number of the items based on a position of an outline of the item region with respect to the region of the shopping basket. Accordingly, the information processing device 10 is able to more accurately specify the number of items in a shopping basket in a system in which a customer personally scans items.

The information processing device 10 specifies, from the acquired image, a first bounding box with respect to each item that surrounds the item and that is contained in the image, specifies a position of an upper border of the first bounding box with respect to each item contained in the image, specifies a position corresponding to all the items stored in the basket from the specified position of the upper border with respect to each item contained in the image, specifies a second bounding box surrounding the basket from the acquired image, specifies a position of a lower border of the second bounding box, specifies an item volume of the items stored in the basket based on the position corresponding to all the items with respect to the position of the lower border, and outputs the number of the items stored in the basket based on the specified volume of the items.

Accordingly, the information processing device 10 is able to more accurately specify the number of items in a shopping basket in the system in which a customer personally scans items.

The information processing device 10 detects, from the acquired image, a first image region with respect to each item contained in the image that surrounds the item, specifies each of a position of an upper border of the first image region with respect to each item contained in the image and the number of the first image regions, detects a second image region that surrounds the basket from the acquired image, specifies an item volume of the items stored in the basket based on a position of a border of the second image region and a position of the upper border of the first image region, specifies an area of an image region of the items stored in the basket that is contained in the image using the first image region with respect to each item, and specifies the number of the items stored in the basket by inputting the item volume, the area of the image region of the items, and the number of the first image regions into a trained machine learning model.

Accordingly, the information processing device 10 is able to more accurately specify the number of items in a shopping basket in the system in which a customer personally scans items.

A process of calculating the number of the items that is executed by the information processing device 10 includes a process of calculating a size of the region of the item in the image, which is a rectangular region, calculating a second number of the items that are extracted from the image, and calculating the number of the items stored in the basket based on the size of the region, the second number of the items, and the specified position of the outline.

Accordingly, the information processing device 10 is able to more accurately specify the number of items in a shopping basket in the system in which a customer personally scans items.

The information processing device 10 specifies a first self-checkout terminal device that a first person with the basket uses from a second image of an area containing self-checkout terminal devices, receives item information on items to be purchased from the first self-checkout terminal device, specifies a third number of the items to be purchased based on the item information, and determines whether there is an item that is not registered as an item to be purchased in the self-checkout terminal device based on the number of the items that is calculated based on the specified position of the outline and the third number.

Accordingly, the information processing device 10 is able to more accurately specify the number of items in a shopping basket in the system in which a customer personally scans items.

A process of receiving the item information that is executed by the information processing device 10 includes a process of receiving, from the first self-checkout terminal device, the item information that is generated in a way that an information processing terminal device that the first person uses scans and then registers barcodes or two-dimensional codes that are assigned to the items.

Accordingly, the information processing device 10 is able to more accurately specify the number of items in a shopping basket in the system in which a customer personally scans items.

The process of calculating the number of the items that is executed by the information processing device 10 includes a process of specifying a second number of the items that are extracted from the image, calculating an average of positions of top sides of outlines of the item regions in the image with respect to the extracted basket region, and calculating the number of the items stored in the basket by correcting the second number of the items based on the average.

Accordingly, the information processing device 10 is able to more accurately specify the number of items in a shopping basket in the system in which a customer personally scans items.

The information processing device 10 executes a process of specifying a personal item of a first person with the basket that is contained in the extracted basket region and the process of calculating the number of the items includes a process of calculating the number of the items stored in the basket excluding the specified personal item.

Accordingly, the information processing device 10 is able to more accurately specify the number of items in a shopping basket in the system in which a customer personally scans items.

A process of specifying a position of an outline that is executed by the information processing device 10 includes specifying a position of the outline by instance segmentation.

Accordingly, the information processing device 10 is able to more accurately specify the number of items in a shopping basket in the system in which a customer personally scans items.

The information processing device 10 executes a process of specifying a type of the item contained in the extracted basket region and the process of calculating the number of the items includes a process of calculating the number of the items stored in the basket further based on the type of the item.

Accordingly, the information processing device 10 is able to more accurately specify the number of items in a shopping basket in the system in which a customer personally scans items.

The process of extracting the basket region that is executed by the information processing device 10 includes a process of, after executing rotational correction on the image, extracting the basket region in the image on which rotational correction has been performed.

Accordingly, the information processing device 10 is able to more accurately specify the number of items in a shopping basket in the system in which a customer personally scans items.

System

The process procedure, control procedure, specific names, and information including various types of data and parameters that are presented in the above description and the drawings may be changed freely unless otherwise noted. Specific examples, distributions, and numerical values described in the example are examples only and they may be changed freely.

Specific modes of distribution and integration of components of each device are not limited to those illustrated in the drawings. In other words, all or part of the components may be distributed or integrated functionally or physically in any unit according to various types of load and usage. Furthermore, all or given part of each processing function of each device can be realized by a CPU or a program that is analyzed and executed by the CPU or can be realized as hardware according to a wired logic.

Hardware

Figure 16:
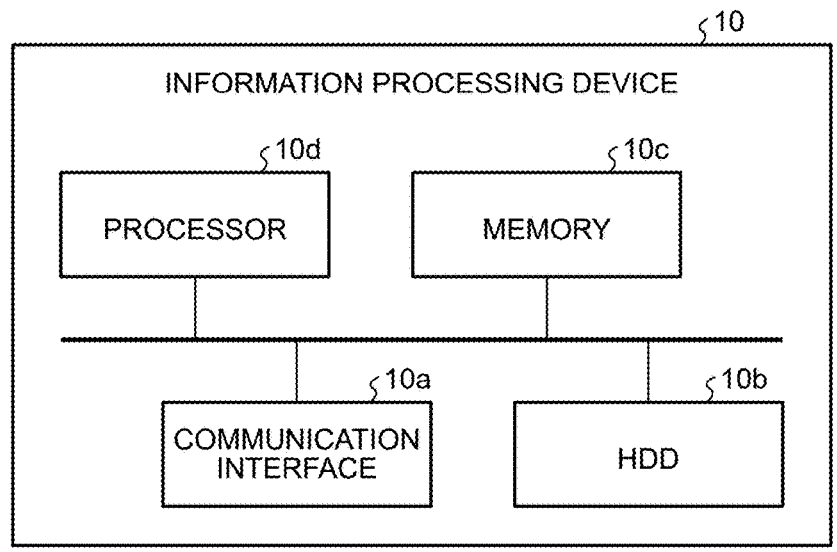
FIG. 16 is a diagram illustrating an example of a hardware configuration of the information processing device 10.

FIG. 16 is a diagram illustrating an example of a hardware configuration of the information processing device 10. As illustrated in FIG. 16, the information processing device 10 includes a communication interface 10a, a hard disk drive (HDD) 10b, a memory 10c, and a processor 10d. The units illustrated in FIG. 16 are connected mutually via a bus, or the like.

The communication interface 10a is a network interface card, or the like, and communicates with another server. The HDD 10b stores a program that runs the functions illustrated in FIG. 5 and a DB.

The processor 10d is a hardware circuit that reads the program for executing the same process as that of each of the processing units illustrated in FIG. 5 from the HDD 10b, or the like, and loads the program in the memory 10c, thereby running the process that implements each of the functions illustrated in FIG. 5, etc. In other words, the process executes implements the same function as that of each processing unit that the information processing device 10 includes. Specifically, the processor 10d reads the program with the same functions as those of the detector 41, the specifying unit 42, the calculator 43, the notification unit 44, etc., from the HDD 10b, or the like. The processor 10d executes the process of executing the same process as that performed by the specifying unit 42, etc.

As described above, by reading and executing the program for executing the same process as that of each of the processing units illustrated in FIG. 5, the information processing device 10 runs as an information processing device that executes an operation control process. The information processing device 10 is also able to realize the same functions as those of the above-described example by reading the program from a recording medium using a medium reading device and executing the read program. Programs according to other examples are not limited to being executed by the information processing device 10. For example, the present embodiment may be similarly applied to the case where another information processing device executes the program or the information processing device 10 and another information processing device execute the program cooperatively.

The program for executing the same process as that of each of the processing units illustrated in FIG. 5 can be distributed via a network, such as the Internet. The program is recorded in a computer-readable recording medium, such as a hard disk, a flexible disk (FD), a CD-ROM, a magneto-optical disk (MO), or a digital versatile disc (DVD) and is read by a computer from the recording medium, so that the program can be executed.

Figure 17:
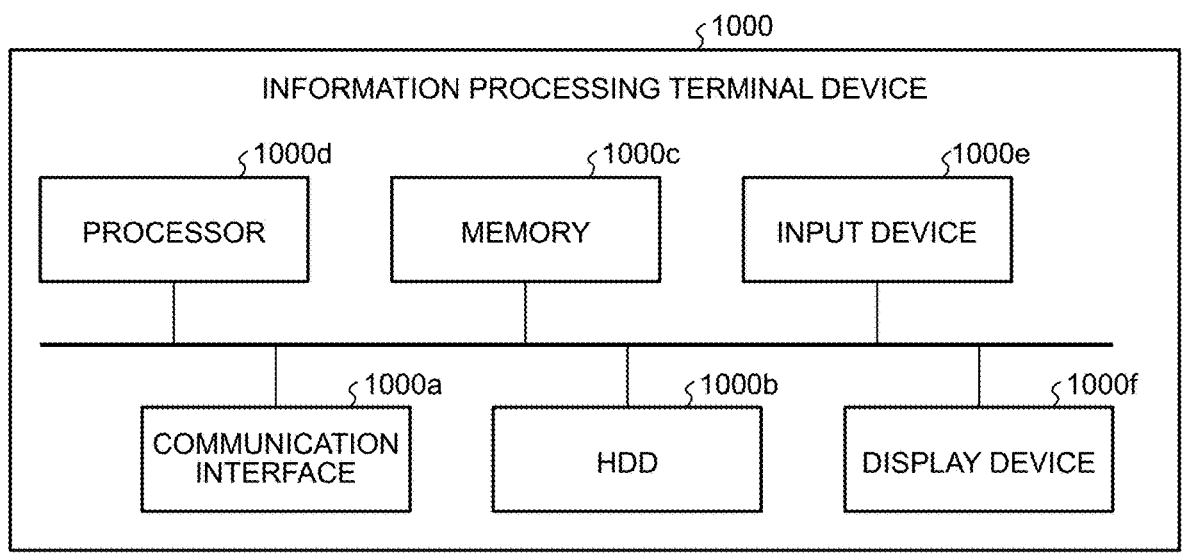
FIG. 17 is a diagram illustrating an example of a hardware configuration of an information processing terminal device 1000.

FIG. 17 is a diagram illustrating an example of a hardware configuration of an information processing terminal device 1000. The user terminal device 100 and the store staff terminal device 300 may have the same configuration and therefore the user terminal device 100 and the store staff terminal device 300 are collectively referred to as the information processing terminal device 1000 and the information processing terminal device 1000 is illustrated as an example of a hardware configuration of the user terminal device 100 and the store staff terminal device 300. As illustrated in FIG. 17, the information processing terminal device 1000 includes a communication interface 1000a, a HDD 1000b, a memory 1000c, a processor 1000d, an input device 1000e, and a display device 1000f. The units illustrated in FIG. 17 are connected mutually via a bus, or the like.

The communication interface 1000a is a network interface card, or the like, and communicates with another information processing device. The HDD 1000b stores a program that runs each function of the information processing terminal device 1000 and data.

The processor 1000d is a hardware circuit that reads the program for executing a process of each function of the information processing terminal device 1000 from the HDD 1000b, or the like, and loads the program in the memory 1000c, thereby running a process that implements each function of the information processing terminal device 1000. In other words, the process implements the same function as that of each processing unit that the information processing terminal device 1000 includes.

As described above, by reading and executing the program for executing the process of each function of the information processing terminal device 1000, the information processing terminal device 1000 runs as an information processing device that executes an operation control process. The information processing terminal device 1000 is also able to realize each function of the information processing terminal device 1000 by reading the program from a recording medium using a medium reading device and executing the read program. Programs according to other examples are not limited to being executed by the information processing terminal device 1000. For example, the present embodiment may be similarly applied to the case where another information processing device executes the program or the information processing terminal device 1000 and another information processing device execute the program cooperatively The program for executing the process of each function of the information processing terminal device 1000 can be distributed via a network, such as the Internet. The program is recorded in a computer-readable recording medium, such as a hard disk, a FD, a CD-ROM, a MO, or a DVD and is read by a computer from the recording medium, so that the program can be executed.

The input device 1000e senses various input operations of a user, such as an input operation on the program that is executed by the processor 1000d. The input operation includes, for example, a touch operation and insertion of an earphone terminal to the information processing terminal device 1000. The touch operation refers to various contact operations on the display device 1000f, for example, a tap, a double tap, a swipe, and a pinch. The touch operation includes, for example, a motion of moving an object, such as a finger, close to the display device 1000f. The input device 1000e may be, for example, a button, a touch panel, or a proximity sensor.

The display device 1000f displays various types of visual information according to control performed by the processor 1000d. The display device 1000f may be a liquid crystal display (LCD) or an organic light emitting diode (OLED) that is what is referred to as an organic electro-luminescence (EL) display.

Figure 18:
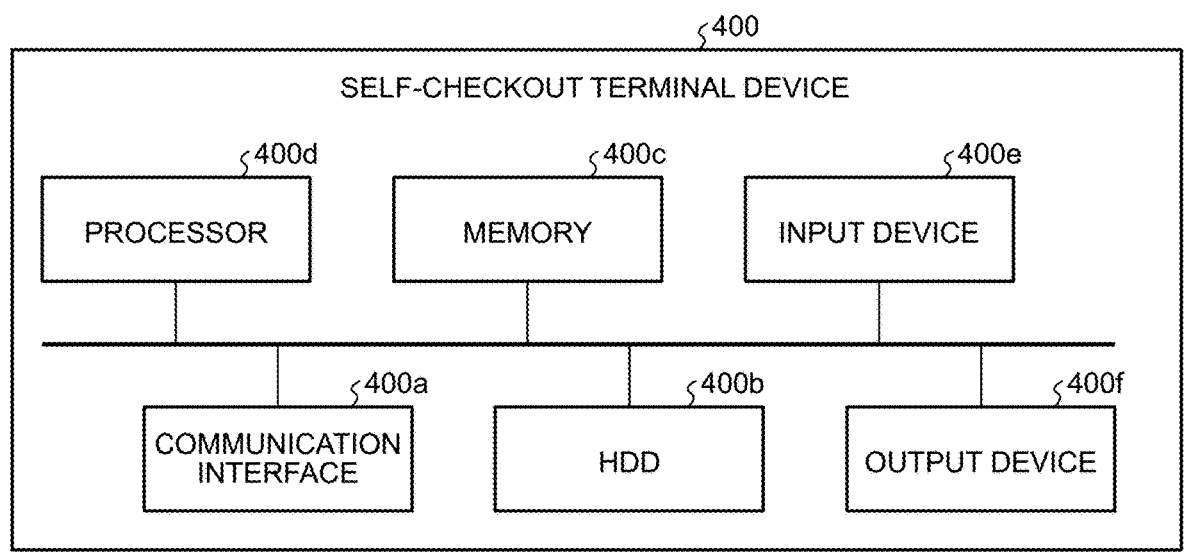
FIG. 18 is a diagram illustrating an example of a hardware configuration of a self-checkout terminal device 400.

FIG. 18 is a diagram illustrating an example of a hardware configuration of the self-checkout terminal device 400. As illustrated in FIG. 18, the self-checkout terminal device 400 includes a communication interface 400a, a HDD 400b, a memory 400c, a processor 400d, an input device 400e, and an output device 400f. The units illustrated in FIG. 18 are connected mutually via a bus, or the like.

The communication interface 400a is a network interface card, or the like, and communicates with another information processing device. The HDD 400b stores a program that runs each function of the self-checkout terminal device 400 and data.

The processor 400d is a hardware circuit that reads the program for executing a process of each function of the self-checkout terminal device 400 from the HDD 400b, or the like, and loads the program in the memory 400c, thereby running a process that implements each function of the self-checkout terminal device 400. In other words, the process implements the same function as that of each processing unit that the self-checkout terminal device 400 includes.

As described above, by reading and executing the program for executing the process of each function of the self-checkout terminal device 400, the self-checkout terminal device 400 runs as an information processing device that executes an operation control process. The self-checkout terminal device 400 is also able to implement each function of the self-checkout terminal device 400 by reading the program from a recording medium using a medium reading device and executing the read program. Programs according to other examples are not limited to being executed by the self-checkout terminal device 400. For example, the present embodiment may be similarly applied to the case where another information processing device executes the program or the self-checkout terminal device 400 and another information processing device execute the program cooperatively The program for executing the process of each function of the self-checkout terminal device 400 can be distributed via a network, such as the Internet. The program is recorded in a computer-readable recording medium, such as a hard disk, a FD, a CD-ROM, a MO, or a DVD and is read by a computer from the recording medium, so that the program can be executed.

The input device 400e senses various input operations of a user, such as an input operation on the program that is executed by the processor 400d. The input operation includes, for example, a touch operation. In the case of the touch operation, the self-checkout terminal device 400 further includes a display device and the input operation that is sensed by the input device 400e may be a touch operation on the display device. The input device 400e may be, for example, a button, a touch panel, or a proximity sensor.

The output device 400f outputs data that is output from the program that is executed by the processor 400d via an external device that is connected to the self-checkout terminal device 400, for example, an external display device. Note that, when the self-checkout terminal device 400 includes a display device, the self-checkout terminal device 400 need not include the output device 400f.

According to an aspect, in a system in which a customer personally scans items, it is possible to more accurately specify the number of items in a shopping basket.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
   acquiring an image of an object storing items that is captured;
   extracting an object region of the object contained in the image by analyzing the image acquired;
   extracting one or more item regions contained in the extracted object region by analyzing the image acquired;
   estimating an item volume of the items in the object based on a position of an outline of the item region with respect to a position of the extracted object region; and specifying a number of items in the object based on the specified item volume, wherein the process further includes:

specifying, from the acquired image, a first bounding box with respect to each item that surrounds the item and that is contained in the image;

specifying a position of an upper border of the first bounding box with respect to each item contained in the image;

specifying a position corresponding to all the items in the object from the position of the upper border with respect to each item contained in the image;

specifying a second bounding box that surrounds the object from the acquired image;

specifying a position of a lower border of the second bounding box;

specifying an item volume of the items in the object based on the position corresponding to all the items with respect to the position of the lower border; and outputting the number of the items in the object based on the specified volume of the items.

2. The non-transitory computer-readable recording medium having stored therein according to claim 1, wherein the program further causes the computer to execute detecting, from the acquired image, a first image region with respect to each item that surrounds the item and that is contained in the image;

specifying each of a position of an upper border of the first image region with respect to each item that is contained in the image and the number of the first image regions;

detecting a second image region that surrounds the object from the acquired image;

specifying an item volume of the items in the object based on a position of a border of the second image region and the position of the upper border of the first image region;

specifying an area of an image region of the items in the object that is contained in the image using the first image region with respect to each item; and specifying the number of the items in the object by inputting the item volume, the area of the image region of the items, and the number of the first image regions into a trained machine learning model.

3. The non-transitory computer-readable recording medium having stored therein according to claim 1, wherein the specifying the number of the items includes calculating a size of the region of the item in the image, which is a rectangular region, calculating a second number of the items extracted from the image, and specifying the number of the items in the object based on the size of the region, the second number of the items, and the specified position of the outline.

4. The non-transitory computer-readable recording medium having stored therein according to claim 1, wherein the program further causes the computer to execute specifying a first self-checkout terminal that a first person with the object uses from a second image of an area containing self-checkout terminals, receiving item information on items to be purchased from the first self-checkout terminal, specifies a third number of the items to be purchased based on the item information, and determining whether there is the item that is not registered as the item to be purchased in the self-checkout terminal based on the number of the items that is calculated based on the specified position of the outline and the third number.

5. The non-transitory computer-readable recording medium having stored therein according to claim 4, wherein the receiving the item information includes receiving, from the first self-checkout terminal, the item information that is generated in a way that an information processor that the first person uses scans and then registers barcodes or two-dimensional codes that are assigned to the items.

6. The non-transitory computer-readable recording medium having stored therein according to claim 1, wherein the estimating the item volume includes calculating an average of positions of top sides of outlines of the item regions in the image with respect to the extracted object region, and estimating the item volume by correcting the average based on the object position.

7. The non-transitory computer-readable recording medium having stored therein according to claim 1, wherein the program further causes the computer to execute specifying a personal item of a first person with the object that is contained in the extracted object region, and the specifying the number of the items includes specifying the number of the items in the object excluding the specified personal item.

8. The non-transitory computer-readable recording medium having stored therein according to claim 1, wherein the program further causes the computer to execute specifying a position of the outline by instance segmentation.

9. The non-transitory computer-readable recording medium having stored therein according to claim 1, wherein the program further causes the computer to execute specifying a type of the item contained in the extracted object region, and the calculating the number of the items includes calculating the number of the items in the object further based on the type of the item.

10. The non-transitory computer-readable recording medium having stored therein according to claim 1, wherein the extracting the object region includes, after executing rotational correction on the image, extracting the object region in the image on which rotational correction has been performed.

11. An information processing method executed by a computer, the method comprising:

acquiring an image of an object storing items that is captured;

extracting an object region of the object contained in the image by analyzing the image acquired;

extracting one or more item regions contained in the extracted object region by analyzing the image acquired;

estimating an item volume of the items in the object based on a position of an outline of the item region with respect to a position of the extracted object region; and specifying a number of items in the object based on the specified item volume, wherein the method further includes:

specifying, from the acquired image, a first bounding box with respect to each item that surrounds the item and that is contained in the image;

specifying a position of an upper border of the first bounding box with respect to each item contained in the image;

specifying a position corresponding to all the items in the object from the position of the upper border with respect to each item contained in the image;
specifying a second bounding box that surrounds the object from the acquired image;
specifying a position of a lower border of the second bounding box;
specifying an item volume of the items stored in the object based on the position corresponding to all the items with respect to the position of the lower border; and
outputting the number of the items in the object based on the specified volume of the items.

12. The information processing method according to claim 11, further comprising:
   detecting, from the acquired image, a first image region with respect to each item that surrounds the item and that is contained in the image;
   specifying each of a position of an upper border of the first image region with respect to each item that is contained in the image and the number of the first image regions;
   detecting a second image region that surrounds the object from the acquired image;
   specifying an item volume of the items in the object based on a position of a border of the second image region and the position of the upper border of the first image region;
   specifying an area of an image region of the items in the object that is contained in the image using the first image region with respect to each item; and
   specifying the number of the items in the object by inputting the item volume, the area of the image region of the items, and the number of the first image regions into a trained machine learning model.

13. The information processing method according to claim 11, wherein the specifying the number of the items includes calculating a size of the region of the item in the image, which is a rectangular region,
   calculating a second number of the items extracted from the image, and
   specifying the number of the items in the object based on the size of the region, the second number of the items, and the specified position of the outline.

14. The information processing method according to claim 11, further comprising:
   specifying a first self-checkout terminal that a first person with the object uses from a second image of an area containing self-checkout terminals,
   receiving item information on items to be purchased from the first self-checkout terminal,
   specifies a third number of the items to be purchased based on the item information, and
   determining whether there is the item that is not registered as the item to be purchased in the self-checkout terminal based on the number of the items that is calculated based on the specified position of the outline and the third number.

15. An information processing device, comprising:
   a memory; and
   a processor coupled to the memory and the processor configured to:
      acquire an image of an object storing items that is captured;
      extract an object region of the object contained in the image by analyzing the image acquired;
      extract one or more item regions contained in the extracted object region by analyzing the image acquired;
      estimate an item volume of the items in the object based on a position of an outline of the item region with respect to a position of the extracted object region; and
      specify a number of items in the object based on the specified item volume, wherein the processor is further configured to:
   specify, from the acquired image, a first bounding box with respect to each item that surrounds the item and that is contained in the image;
   specify a position of an upper border of the first bounding box with respect to each item contained in the image;
   specify a position corresponding to all the items in the object from the position of the upper border with respect to each item contained in the image;
   specify a second bounding box that surrounds the object from the acquired image;
   specify a position of a lower border of the second bounding box;
   specify an item volume of the items in the object based on the position corresponding to all the items with respect to the position of the lower border; and
   output the number of the items in the object based on the specified volume of the items.

16. The information processing device according to claim 15, wherein the processor configured to
   detect, from the acquired image, a first image region with respect to each item that surrounds the item and that is contained in the image;
   specify each of a position of an upper border of the first image region with respect to each item that is contained in the image and the number of the first image regions;
   detect a second image region that surrounds the object from the acquired image;
   specify an item volume of the items in the object based on a position of a border of the second image region and the position of the upper border of the first image region;
   specify an area of an image region of the items in the object that is contained in the image using the first image region with respect to each item; and
   specify the number of the items in the object by inputting the item volume, the area of the image region of the items, and the number of the first image regions into a trained machine learning model.

17. The information processing device according to claim 15, wherein the specifying the number of the items includes
   calculating a size of the region of the item in the image, which is a rectangular region,
   calculating a second number of the items extracted from the image, and
   specifying the number of the items in the object based on the size of the region, the second number of the items, and the specified position of the outline.

18. The information processing device according to claim 15, wherein the processor configured to
   specify a first self-checkout terminal that a first person with the object uses from a second image of an area containing self-checkout terminals;
   receive item information on items to be purchased from the first self-checkout terminal;
   specify a third number of the items to be purchased based on the item information; and
   determine whether there is the item that is not registered as the item to be purchased in the self-checkout terminal based on the number of the items that is calculated based on the specified position of the outline and the third number.

19. The information processing device according to claim 18, wherein the receiving the item information includes receiving, from the first self-checkout terminal, the item information that is generated in a way that an information processing terminal that the first person uses scans and then registers barcodes or two-dimensional codes that are assigned to the items.

20. The information processing device according to claim 15, wherein the estimating the item volume includes
calculating an average of positions of top sides of outlines of the item regions in the image with respect to the extracted object region, and
estimating the item volume by correcting the average based on the object position.

\* \* \* \* \*